(12) United States Patent
Hong

(10) Patent No.: US 10,008,936 B2
(45) Date of Patent: Jun. 26, 2018

(54) SCHEME FOR AUTOMATICALLY SEARCHING OPTIMAL PHASE SHEDDING THRESHOLD FOR VOLTAGE CONVERTER HAVING MULTI-PHASE OUTPUT STAGE CIRCUIT

(71) Applicant: MEDIATEK INC., Hsin-Chu (TW)

(72) Inventor: Shan-Fong Hong, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 192 days.

(21) Appl. No.: 14/987,735

(22) Filed: Jan. 4, 2016

(65) Prior Publication Data

US 2017/0077806 A1    Mar. 16, 2017

Related U.S. Application Data

(60) Provisional application No. 62/217,044, filed on Sep. 11, 2015.

(51) Int. Cl.
*H02M 3/158* (2006.01)
*H02M 1/00* (2006.01)

(52) U.S. Cl.
CPC .. *H02M 3/1584* (2013.01); *H02M 2001/0032* (2013.01); *H02M 2001/0054* (2013.01); *Y02B 70/1491* (2013.01); *Y02B 70/16* (2013.01)

(58) Field of Classification Search
CPC ............ H02M 3/00; H02M 3/02; H02M 3/04; H02M 3/10; H02M 3/145; H02M 3/155; H02M 3/156; H02M 3/157; H02M 3/158; H02M 3/1582; H02M 3/1584; H02M 3/1588; H02M 2001/009; H02M 2001/0012; H02M 2001/0025; H02M 2001/0032; H02M 2001/0067; H02M 2001/007; H02M 2001/0074; H02M 2001/0077; H02M 2001/008; H02M 2001/0054; H02M 2003/1566; H02M 2003/1586; Y02B 70/16; Y02B 70/1458; Y02B 70/1466; Y02B 70/1491
USPC ....... 363/36, 65–72, 123–127; 323/212–219, 323/222–226, 271–277, 280–286, 323/299–303, 351; 700/286, 297, 298
See application file for complete search history.

(56) References Cited

U.S. PATENT DOCUMENTS

| 8,742,738 B2 | 6/2014 | Houston |
| 2007/0013350 A1 | 1/2007 | Tang |
| 2008/0129260 A1* | 6/2008 | Abu Qahouq ...... H02M 3/1584 323/272 |

\* cited by examiner

*Primary Examiner* — Timothy J Dole
*Assistant Examiner* — Carlos Rivera-Perez
(74) *Attorney, Agent, or Firm* — Winston Hsu

(57) ABSTRACT

A method for performing phase shedding for a voltage converter having a multi-phase output stage circuit includes: sensing an input current of the voltage converter to generate a first digital signal when enabling at least one first output stage within the multi-phase output stage circuit; sensing the input current of the voltage converter to generate a second digital signal when further enabling a second output stage within the multi-phase output stage circuit; comparing the first digital signal with the second digital signal to generate a comparison resultant signal; dynamically adjusting the phase shedding threshold according to the comparison resultant signal, to automatically search/determine an optimal phase shedding threshold; and, performing the phase shedding when an operation of the voltage converter exceeds the optimal phase shedding threshold.

10 Claims, 4 Drawing Sheets

SCHEME FOR AUTOMATICALLY SEARCHING OPTIMAL PHASE SHEDDING THRESHOLD FOR VOLTAGE CONVERTER HAVING MULTI-PHASE OUTPUT STAGE CIRCUIT

CROSS REFERENCE TO RELATED APPLICATIONS

This application claims priority of U.S. provisional application Ser. No. 62/217,044 filed on Sep. 11, 2015, which is entirely incorporated herein by reference.

BACKGROUND

The present invention relates to a voltage converter, and more particularly to a voltage converter and corresponding method capable of automatically searching/determining a phase shedding/switching threshold and performing phase shedding for the voltage converter having a multi-phase output stage circuit.

Generally speaking, the power efficiency of a voltage converter having multiple output stages is dependent upon the phase shedding timing between the multiple output stages. The power efficiency of the voltage converter will be poor if this voltage converter merely enables a certain number of output stages to provide different output voltage and current levels. Thus, it is important for the voltage converter to perform phase shedding. However, a currently developed scheme is usually arranged to manually adjust the phase shedding timing for the voltage converter. In addition, an ideal phase shedding timing is usually determined by circuit costs, different output stages, and layouts of printed circuit boards. Thus, practically, it is difficult for the currently developed scheme to calculate and determine the phase shedding timing.

SUMMARY

Therefore one of the objectives of the present invention is to provide a voltage converter and corresponding method capable of automatically searching/determining a phase shedding/switching threshold and performing phase shedding for the voltage converter having a multi-phase output stage circuit, to solve the above-mentioned problems.

According to an embodiment of the present invention, a method for performing phase shedding for a voltage converter having a multi-phase output stage circuit is disclosed. The method comprises: sensing an input current of the voltage converter to generate a first digital signal when enabling at least one first output stage within the multi-phase output stage circuit; sensing the input current of the voltage converter to generate a second digital signal when further enabling a second output stage within the multi-phase output stage circuit; comparing the first digital signal with the second digital signal to generate a comparison resultant signal; dynamically adjusting the phase shedding threshold according to the comparison resultant signal, to automatically search/determine an optimal phase shedding threshold; and, performing the phase shedding when an operation of the voltage converter exceeds the optimal phase shedding threshold.

According to the embodiment, a voltage converter is disclosed. The voltage converter comprises a multi-phase output stage circuit, a sensing circuit, a comparing circuit, and a controller. The sensing circuit is coupled to the multi-phase output stage circuit, configured for sensing an input current of the voltage converter to generate a first digital signal when at least one first output stage within the multi-phase output stage circuit is enabled, and for sensing the input current of the voltage converter to generate a second digital signal when a second output stage within the multi-phase output stage circuit is further enabled. The comparing circuit is coupled to the sensing circuit, and configured for comparing the first digital signal with the second digital signal to generate a comparison resultant signal. The controller is coupled to the comparing circuit and configured for dynamically adjusting the phase shedding threshold according to the comparison resultant signal, to automatically search/determine an optimal phase shedding threshold, and for performing phase shedding when an operation of the voltage converter exceeds the optimal phase shedding threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
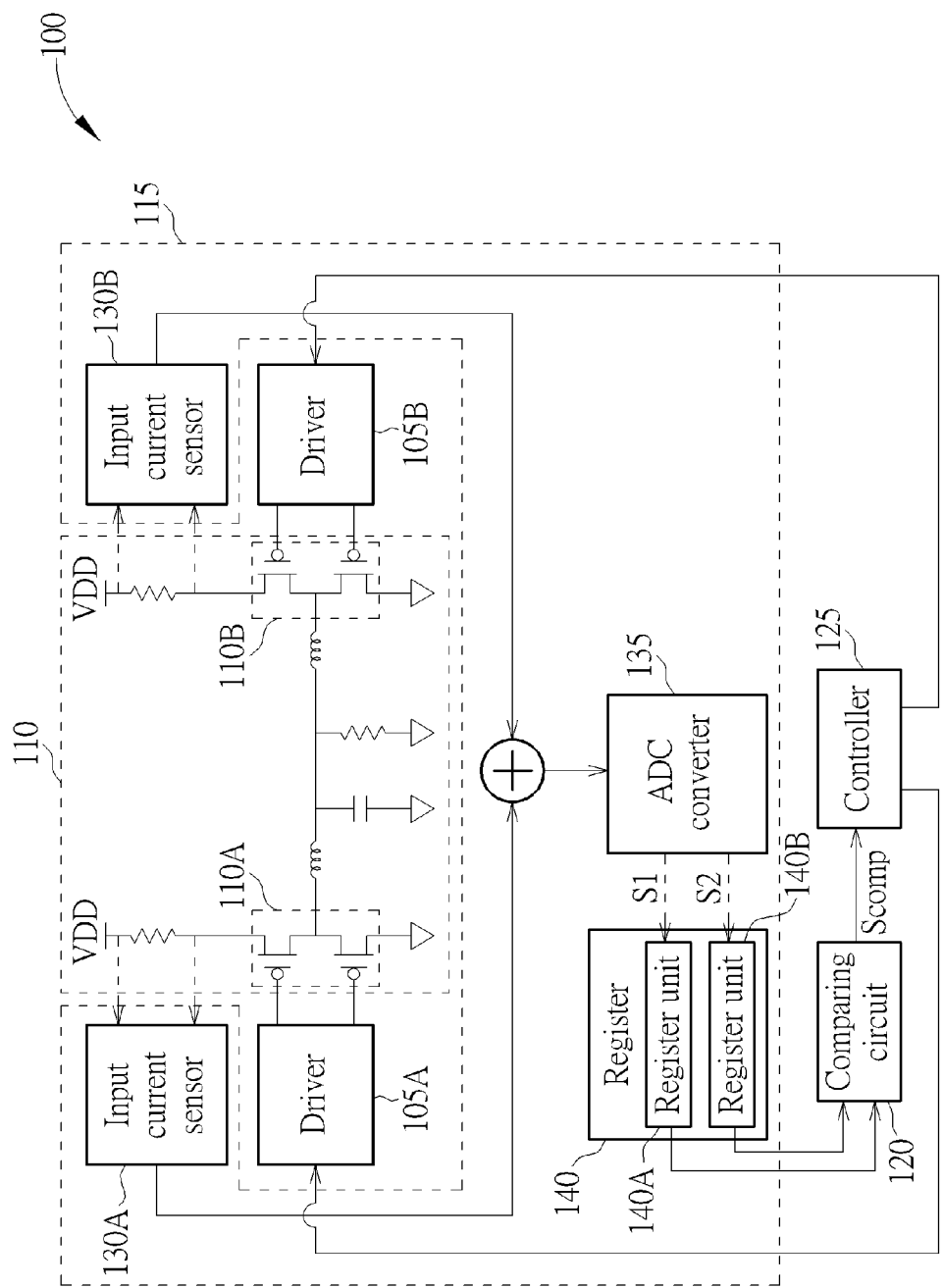
FIG. 1A is a diagram of a voltage converter according to an embodiment of the present invention.

Please refer to FIG. 1A, which illustrates a diagram of a voltage converter 100 according to an embodiment of the present invention. The voltage converter 100 includes a multi-phase output stage circuit topology and comprises multiple drivers such as 105A & 105B, a multi-phase output stage circuit 110 (including two output stages such as 110A & 110B), a sensing circuit 115, a comparing circuit 120, and a controller 125. It should be noted that the number of output stages is not meant to be a limitation; in other embodiments, the voltage converter 100 can comprise more than two output stages. The sensing circuit 115 comprises input current sensors 130A & 130B, ADC converter 135, and the register 140 (including two register units 140A & 140B). The voltage converter 100 for example is a DC-DC buck converter (but not limited). The voltage converter 100 is capable of automatically adjusting/searching/approaching and determining an optimal phase shedding/switching threshold according to input current information provided for the multi-phase output stage circuit 110, to optimize the power efficiency of voltage converter 100. A phase shedding/switching threshold for voltage converter 100 means that the voltage converter 100 decides to enable more output stage(s) to provide output current and output voltage when the operation exceeds the phase shedding/switching threshold. For example, the phase shedding/switching threshold means in which condition the voltage converter 100 decides to further enable another output stage (i.e. enabling two output stages) to provide output current and output voltage if initially only a single one output stage is enabled. The optimal phase shedding/switching threshold means that the voltage converter 100 can achieve better power efficiency by merely enabling a single one output stage if the operation does not exceed the optimal phase shedding/switching threshold and can still achieve better power efficiency by enabling two output stages if the operation exceeds the optimal phase shedding/switching threshold. The voltage converter 100 is arranged to automatically adjust/search/approach and determining the optimal phase shedding/switching threshold, and to operate based on the optimal phase shedding/switching threshold so as to achieve optimal power efficiency.

The voltage converter 100 is arranged to test its output current level step by step to decide which output current level corresponds to the optimal phase shedding threshold according to input current information associated with different output current levels. By automatically adjusting and testing its output current level and dynamically comparing the input current information caused by conditions of enabling different numbers of output stages, the voltage converter 100 can determine a certain output current threshold as the optimal phase shedding threshold. For example, the voltage converter 100 includes two-phase output stages 110A & 110B, and can be arranged for merely enabling a single one output stage and not enabling two output stages 110A & 110B until its output current exceeds above the certain output current threshold, so as to optimize the power efficiency. That is, if its output current level just reaches the output current threshold, the voltage converter 100 can enable a single one output stage. If its output current level exceeds above the output current threshold, the voltage converter 100 decides to enable two output stages.

Figure 1B:
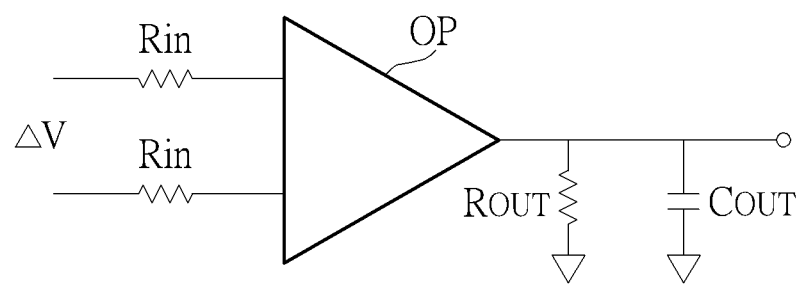
FIG. 1B is a diagram showing an example of input current sensor as shown in FIG. 1A according to an embodiment of the invention.

In practice, the drivers 105A & 105B are arranged for respectively driving switching transistors within the output stages 110A & 110B, to provide output current and voltage. As mentioned above, the voltage converter 100 includes the two-phase output stage circuit 110, and can enable a single one output stage or enable two output stages to provide output voltage and current. The sensing circuit 115 is configured for sensing the input current of voltage converter 100 to generate a first digital signal S1 when at least one first output stage (e.g. 110A or 110B) within the multi-phase output stage circuit is enabled, and for sensing the input current to generate a second digital signal S2 when two output stages within the multi-phase output stage circuit 100 are enabled (i.e. a second output stage is further enabled). In practice, the input current sensors 130A and 130B are used for sensing input currents of different output stages 110A and 110B, respectively. FIG. 1B is a diagram showing an example of input current sensor 130A/130B as shown in FIG. 1A according to an embodiment of the invention. The input current sensor 130A/130B comprises two input resistors Rin, operational amplifier OP, output resistor Rout, and capacitor Cout. The input current sensor 130A/130B detects voltage difference ΔV to sense input current information for a certain output stage, and generates a voltage level at an end of capacitor Cout wherein this generated voltage level is averagely proportional to the input current information. By doing so, the input current sensor 130A/130B can precisely detect input current information for a corresponding output stage. If only a single one output stage 110A is enabled, then the input current sensor 130A senses input current flowing into the output stage 110A and the input current sensor 130B senses no input current. Instead, if both two output stages are enabled, then both the input current sensors 130A and 130B sense input currents flowing into the two output stages 110A & 110B. The sensed input current information is accumulated and sent to the ADC converter 135.

The ADC converter 135 converts the sensed input current information into digital signals S1 and S2. For instance, when only a single one output stage is enabled, the sensed input current information is accumulated and sent to the ADC converter 135, and the ADC converter 135 converts the input current information of the single one output stage into the first digital signal S1 and transmits the signal S1 to the register unit 140A of register 140 so that the digital signal S1 can be buffered in the register unit 140A. When the two output stages are enabled, the sensed input current information is accumulated and sent to the ADC converter 135, and the ADC converter 135 converts the input current information of the two one output stages into the second digital signal S2 and transmits the signal S2 to the register unit 140B of register 140 so that the digital signal S2 can be buffered in the register unit 140B.

The comparing circuit 120 is arranged for comparing the digital signal S1 with digital signal S2 to generate a comparison resultant signal Scomp and sending the signal Scomp to the controller 125. The controller 125 is arranged to dynamically adjusting the phase shedding threshold or searching/approaching the optimal phase shedding threshold (i.e. the output current threshold) according to the comparison resultant signal Scomp. If the comparison resultant signal Scomp indicates that the first digital signal S1 is lower than the second digital signal S2, the controller 125 decides that input current for enabling a single one output stage is smaller than that for enabling two output stages, and can accordingly determine that the power efficiency of only a single output stage is higher than that of two output stages. The controller 125 is arranged to shift the phase shedding threshold to a higher output current level to test whether the higher output current level can be the optimal phase shedding threshold. Instead, if the comparison resultant signal Scomp indicates that the first digital signal S1 is greater than the second digital signal S2, the controller 125 decides that input current for enabling a single one output stage is greater than that for enabling two output stages, and can accordingly determine that the power efficiency of only a single output stage is lower than that of two output stages. The controller 125 is arranged to shift the phase shedding threshold to a lower output current level to test whether the lower output current level can be the optimal phase shedding threshold. In addition, the controller 125 also buffers multiple comparison resultant signals Scomp to check whether the optimal phase shedding threshold is found by checking whether the comparison resultant signals Scomp toggle.

Figure 2:
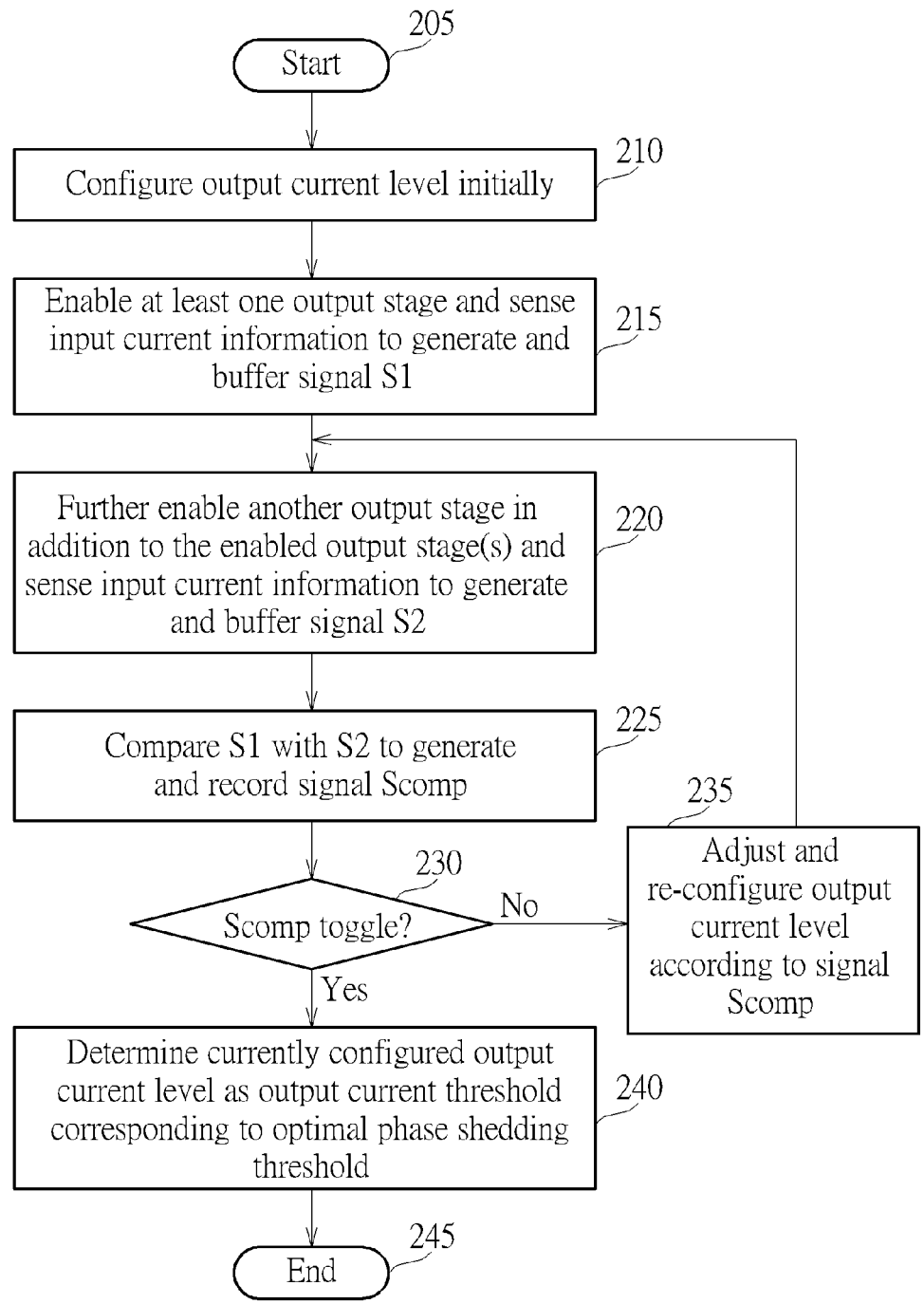
FIG. 2 is a diagram illustrating a flowchart of an example for automatically searching/approaching the optimal phase shedding threshold according to the embodiment of FIG. 1.

The operations of above-mention circuit elements are performed iteratively to automatically adjusting, searching, or approaching and determining which output current threshold corresponds to the optimal phase shedding threshold step by step. FIG. 2 is a diagram illustrating a flowchart of an example for automatically searching/approaching the optimal phase shedding threshold according to the embodiment of FIG. 1. Provided that substantially the same result is achieved, the steps of the flowchart shown in FIG. 2 need not be in the exact order shown and need not be contiguous, that is, other steps can be intermediate. Steps are detailed in the following:

Step 205: Start;
Step 210: Configure an output current level initially;
Step 215: Enable at least one output stage (e.g. 110A or 110B), sense input current information of voltage converter 100 based on the configured/adjusted output current level to generate a first digital signal S1, and buffer the first digital signal S1;

Step 220: Further enable another output stage in addition to the enabled output stage(s), sense the input current information of voltage converter 100 based on the configured/adjusted output current level to generate a second digital signal S2, and buffer the second digital signal S2;

Step 225: Compare the first digital signal S1 with the second digital signal S2 to generate the comparison resultant signal Scomp, and record the comparison resultant signal Scomp;

Step 230: The recorded comparison resultant signals Scomp toggle? If yes, the flow goes to Step 240, otherwise, the flow goes to Step 235;

Step 235: Adjust and re-configure the output current level of voltage converter 100 according to the comparison resultant signal Scomp;

Step 240: Determine that the currently configured output current level is as the output current threshold corresponding to the optimal phase shedding threshold for the voltage converter 100; and Step 245: End.

Figure 3:
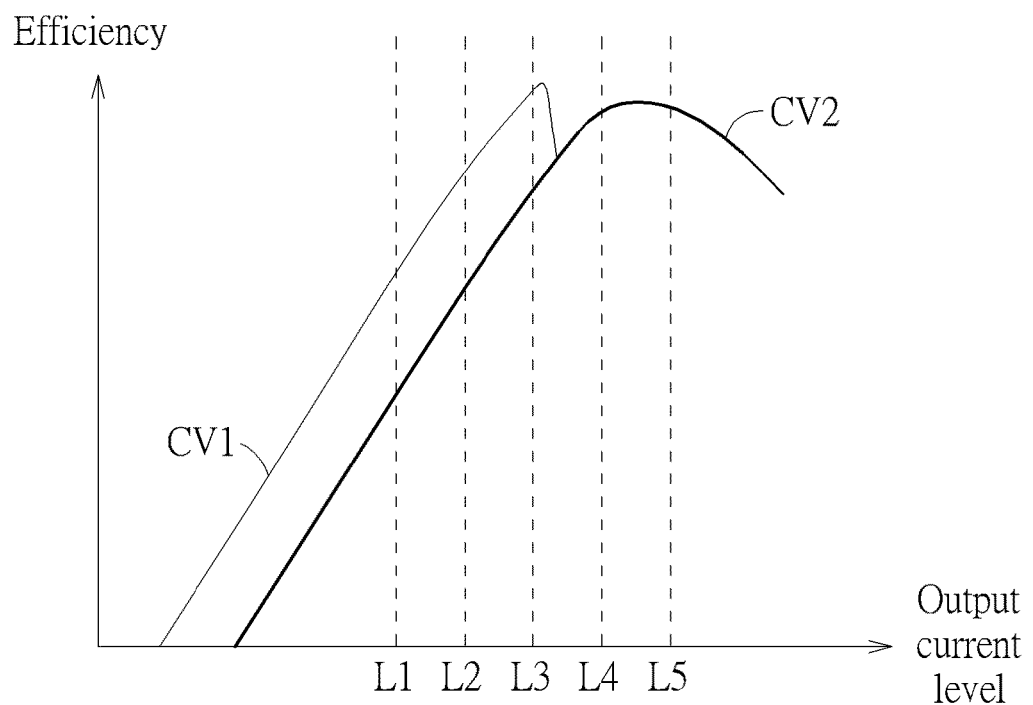
FIG. 3 is a diagram showing an example of a relation between the efficiency and output current level under different conditions for enabling a single one output stage and enabling two output stages according to the embodiment of FIG. 1.

FIG. 3 is a diagram showing an example of a relation between the efficiency and output current level under different conditions for enabling a single one output stage and enabling two output stages according to the embodiment of FIG. 1. As shown in FIG. 3, curve CV1 indicates that only a single one output stage is enabled to provide different output current levels, and curve CV2 (as shown by bold line) indicates that two output stages are enabled to provide different output current levels. For example, to automatically searching the optimal phase shedding threshold, the controller 125 is arranged to set the output current level as L1 initially. The controller 125 controls drivers 105A & 105B to drive either output stage 110A or output stage 110B to enable a single one output stage for providing the output current level L1, and the sensing circuit 115 senses the input current information flowing into the enabled single one output stage, converts the sensed input current information into digital signal S1, and buffers the digital signal S1. The controller 125 then is arranged to further enable another output stage to use two enabled output stages for providing the output current level L1, and the sensing circuit 115 senses the input current information flowing into the two enabled output stages, converts the sensed input current information into digital signal S2, and buffers the digital signal S2.

The comparing circuit 120 compares the signal S1 with signal S2 to generate the comparison resultant signal Scomp which indicates that signal S1 is smaller than signal S2 when the voltage converter 100 provides output current level L1. The power efficiency is inversely proportional to input current flowing into output stage (s). In practice, the comparison resultant signal Scomp can be implemented by a bit wherein bit '0' indicates that signal S1 is smaller than signal S2 and bit '1' indicates that signal S1 is greater than signal S2.

Based on the comparison resultant signal Scomp, the controller 125 can decide that the efficiency of merely enabling a single one output stage is higher than that of enabling two output stages for providing the same output current level L1, and records the signal Scomp (i.e. bit '0'). The controller 125 accordingly can decide that it is not needed to perform phase shedding at this output current level L1 and the optimal phase shedding threshold may occur at a higher output current level. The controller 125 is arranged to shift the phase shedding threshold to a higher output current level to test whether the higher output current level can be set as the optimal phase shedding threshold. The controller 125 is arranged for adjusting and re-configuring the output current level as a higher level and controlling the drivers 105A and 105B to enable a single one output stage and two output stages respectively.

Similarly, for the output current levels L2 and L3, the controller 125 obtains bits '0' from the comparing circuit 120, and thus is arranged to shift the phase shedding threshold to a higher output current level and adjust/re-configure the output current level. For the output current level L4, the controller 125 obtains bits '1' from the comparing circuit 120 wherein the bit '1' indicates that signal S1 is greater than signal S2, and can decide that the efficiency of merely enabling a single one output stage becomes lower than that of enabling two output stages for providing the same output current level L4, and records the bit '1'. The controller 125 is arranged to shift the phase shedding threshold to a lower output current level to test whether the lower output current level can be set as the optimal phase shedding threshold. The controller 125 is arranged for adjusting and re-configuring the output current level as a lower level and controlling the drivers 105A and 105B to enable a single one output stage and two output stages respectively. Thus, for testing the output current level L3, the controller 125 obtains bit '0' again and now records a bit sequence '010', and in this situation the controller 125 can decide that the signal Scomp toggles and forms the bit sequence '010' and can determine that the optimal phase shedding threshold corresponds to the output current level L3. Therefore, to optimize the power efficiency, the controller 125 can control the drivers 105A and 105B to enable only a single one output stage for the output current level not higher than L3 and to enable two output stages for the output current level higher than L3. In this example, the optimal phase shedding threshold occurs at the output current level L3 which is configured as the above-mentioned output current threshold.

In another embodiment, the output current level can be initially configured as L5 and gradually decreased step by step to search the optimal phase shedding threshold. To automatically search the optimal shedding threshold, the controller 125 is arranged to enable a single one output stage for providing the output current level L5, and the sensing circuit 115 is arranged to sense the input current information flowing into the enabled output stage, convert the sensed input current information into digital signal S1, and buffer the digital signal S1. The controller 125 then is arranged to further enable another output stage to use the two enabled output stages for providing the output current level L5, and the sensing circuit 115 is arranged to sense the input current information flowing into the two enabled output stages, convert the sensed input current information into digital signal S2, and buffer the digital signal S2.

The comparing circuit 120 compares the signal S1 with signal S2 to generate the comparison resultant signal Scomp which indicates that signal S1 is greater than signal S2 when the voltage converter 100 provides output current level L5. The comparison resultant signal Scomp carries information of bit '1'. Based on the bit '1', the controller 125 can decide that the efficiency of enabling a single one output stage is lower than that of enabling two output stages for providing the same output current level L5, and records the bit '1'. The controller 125 is arranged to shift the phase shedding threshold to a lower output current level, and is arranged to adjust and re-configure the output current level and to control the drivers 105A and 105B to enable a single one output stage and two output stages respectively. In addition, in the example of providing output current level L5, the controller 125 may obtain a result that enabling a single one output stage cannot provide the higher output current level L5 after the operations of sensing circuit 115 and comparing circuit 120 are performed. The controller 125 can accordingly know that it is not enough to merely enable a single one output stage for providing the output current level L5 and two output stages should be enabled for providing output current level L5. The controller 125 then is arranged to decide to shift the phase shedding threshold to a lower output current level and to test other output current levels.

For testing the output current level L4, the controller 125, sensing circuit 115, and comparing circuit 120 are arranged to perform similar operations, and the controller 125 obtains bit '1' carried by the comparison resultant signal Scomp, and thus is arranged to decide to shift the phase shedding threshold to a lower output current level L3. For testing the output current level L3, the controller 125 obtains bits '0' which indicates that signal S1 becomes greater than signal S2, and is arranged for shifting the phase shedding threshold to a higher output current level L4. For testing the output current level L4 again, the controller 125 obtains bit '1' again. In this situation, the controller 125 receives a bit sequence '101' and can decide that the signal Scomp toggles and forms the bit sequence '101' and can determine that the optimal phase shedding threshold corresponds to the output current level L3. Therefore, to optimize the power efficiency, the controller 125 can control the drivers 105A and 105B to enable only a single one output stage for the output current level not lower than L3 and to enable two output stages for the output current level higher than L3.

Further, it should be noted that the operations mention above can be also applied for automatically searching the optimal phase shedding point for switching between enabling N output stages and enabling N+1 output stages wherein N is an integer which is equal to two or is more than 2. Additionally, in another embodiment, the sensing circuit 115, comparing circuit 120, and controller 125 can be implemented by using externally-connected circuit elements which are not included within the voltage converter 100. That is, the operation of automatically searching/determining an optimal phase shedding threshold for a voltage converter can be executed by an external equipment device to test the voltage converter, and the test result (i.e. the found optimal phase shedding threshold) can be respectively stored within a control circuit to control the drivers 105A & 105B. This scheme also falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing phase shedding for a voltage converter having a multi-phase output stage circuit, and the method comprises:
sequentially testing one of a plurality of output current levels to automatically search or determine a particular output current level, among the output current levels, as a phase shedding threshold which is used as a reference for determining whether to enable at least one first output stage within the multi-phase output stage circuit or enable the at least one first output stage and a second output stage within the multi-phase output stage circuit, the sequentially testing step for testing one of the plurality of output current levels comprising:
(a) sensing an input current of the voltage converter to generate a first digital signal when enabling the at least one first output stage within the multi-phase output stage circuit;
(b) sensing the input current of the voltage converter to generate a second digital signal when enabling the at least one first output stage and the second output stage within the multi-phase output stage circuit;
(c) comparing the first digital signal with the second digital signal to generate a comparison resultant signal; and
(d) dynamically adjusting the phase shedding threshold from the output current level to a different output current level according to the comparison resultant signal; and
performing the phase shedding when an operation of the voltage converter exceeds an optimal phase shedding threshold;
wherein when the comparison resultant signal indicates that the first digital signal is smaller than the second digital signal, and the step (d) is arranged to shift the phase shedding threshold to a higher output current level; and, when the comparison resultant signal indicates that the first digital signal is greater than the second digital signal, and the step (d) is arranged to shift the phase shedding threshold to a lower output current level.

2. The method of claim 1, wherein the step (a) comprises:
sensing the input current of the voltage converter when the at least one first output stage within the multi-phase output stage circuit is enabled, and converting the detected input current into the first digital signal and buffering the first digital signal; and
the step (b) comprises:
sensing the input current of the multi-phase voltage converter when the second output stage within the multi-phase output stage circuit is further enabled, and converting the detected input current into the second digital signal and buffering the second digital signal.

3. The method of claim 2, wherein the step (a) comprises:
enabling a single one first output stage within the multi-phase output stage circuit, and then detecting the input current of the voltage converter for converting the detected input current into the first digital signal.

4. The method of claim 1, wherein the steps (a) (d) are performed iteratively for the plurality of output current levels to automatically adjust the phase shedding threshold to approach the particular output current level step by step.

5. A voltage converter, comprising:
a multi-phase output stage circuit;
a sensing circuit, coupled to the multi-phase output stage circuit, configured for sensing an input current of the voltage converter to generate a first digital signal when at least one first output stage within the multi-phase output stage circuit is enabled, and for sensing the input current of the voltage converter to generate a second digital signal when a second output stage within the multi-phase output stage circuit is further enabled;
a comparing circuit, coupled to the sensing circuit, configured for comparing the first digital signal with the second digital signal to generate a comparison resultant signal; and
a controller, coupled to the comparing circuit, configured for respectively controlling enablement of the at least one first output stage, enablement of the second output stage, and the sensing circuit to sequentially test one of a plurality of output current levels to automatically search or determine a particular output current level, among the output current levels, as a phase shedding threshold which is used as a reference for determining whether to enable the at least one first output stage or enable the at least one first output stage and the second output stage, and, the controller is arranged for dynamically adjusting the phase shedding threshold from the output current level to a different output current level according to the comparison resultant signal and for performing phase shedding when an operation of the voltage converter exceeds an optimal phase shedding threshold;

wherein when the comparison resultant signal indicates that the first digital signal is smaller than the second digital signal, and the controller is arranged to shift the phase shedding threshold to a higher output current level; and, when the comparison resultant signal indicates that the first digital signal is greater than the second digital signal, and the controller is arranged to shift the phase shedding threshold to a lower output current level.

6. The voltage converter of claim 5, wherein the sensing circuit comprises:
   an input current sensor, configured for sensing the input current of the voltage converter when the at least one first output stage within the multi-phase output stage circuit is enabled, and for sensing the input current of the voltage converter when the second output stage within the multi-phase output stage circuit is further enabled;
   an ADC converter, coupled to the input current sensor, configured for converting the detected input current into the first digital signal when the at least one first output stage within the multi-phase output stage circuit is enabled, and for converting the detected input current into the second digital signal when the second output stage within the multi-phase output stage circuit is further enabled; and
   a register, coupled to the ADC converter, configured for buffering the first digital signal and the second digital signal.

7. The voltage converter of claim 5, wherein the sensing circuit is arranged for enabling a single one first output stage within the multi-phase output stage circuit, and then detecting the input current of the voltage converter for converting the detected input current into the first digital signal.

8. The voltage converter of claim 5, wherein the sensing circuit, the comparing circuit, and the controller are performed iteratively for different the plurality of output current levels to automatically adjust the phase shedding threshold to approach the particular output current level the optimal phase shedding threshold step by step.

9. A method for performing phase shedding for a voltage converter having a multi-phase output stage circuit, and the method comprises:
   (a) sensing an input current of the voltage converter to generate a first digital signal when enabling at least one first output stage within the multi-phase output stage circuit;
   (b) sensing the input current of the voltage converter to generate a second digital signal when further enabling a second output stage within the multi-phase output stage circuit;
   (c) comparing the first digital signal with the second digital signal to generate a comparison resultant signal;
   (d) dynamically adjusting a phase shedding threshold from an output current level to a different output current level according to the comparison resultant signal, the phase shedding threshold being used as a reference for determining whether to enable the at least one first output stage within the multi-phase output stage circuit or enable the at least one first output stage and the second output stage within the multi-phase output stage circuit; and
   (e) performing the phase shedding when an operation of the voltage converter exceeds the phase shedding threshold;
   wherein when the comparison resultant signal indicates that the first digital signal is smaller than the second digital signal, and the step (d) is arranged to shift the phase shedding threshold to a higher output current level; and, when the comparison resultant signal indicates that the first digital signal is greater than the second digital signal, and the step (d) is arranged to shift the phase shedding threshold to a lower output current level.

10. A voltage converter, comprising:
   a multi-phase output stage circuit;
   a sensing circuit, coupled to the multi-phase output stage circuit, configured for sensing an input current of the voltage converter to generate a first digital signal when at least one first output stage within the multi-phase output stage circuit is enabled, and for sensing the input current of the voltage converter to generate a second digital signal when a second output stage within the multi-phase output stage circuit is further enabled;
   a comparing circuit, coupled to the sensing circuit, configured for comparing the first digital signal with the second digital signal to generate a comparison resultant signal; and
   a controller, coupled to the comparing circuit, configured for dynamically adjusting a phase shedding threshold from an output current level to a different output current level according to the comparison resultant signal and for performing phase shedding when an operation of the voltage converter exceeds the phase shedding threshold, the phase shedding threshold being used as a reference for determining whether to enable the at least one first output stage within the multi-phase output stage circuit or enable the at least one first output stage and the second output stage within the multi-phase output stage circuit;
   wherein when the comparison resultant signal indicates that the first digital signal is smaller than the second digital signal, and the controller is arranged to shift the phase shedding threshold to a higher output current level; and, when the comparison resultant signal indicates that the first digital signal is greater than the second digital signal, and the controller is arranged to shift the phase shedding threshold to a lower output current level.

* * * * *